Feb. 10, 1970    F. F. HILTZ ET AL    3,495,077
APPARATUS FOR DETERMINING THE TIME INTERVAL CORRELATION
OF THE OCCURRENCE OF PULSES
Filed April 4, 1966    4 Sheets-Sheet 1

INVENTORS
FREDERICK F. HILTZ
CARROLL T. PARDOE

BY

ATTORNEY

INVENTORS
FREDERICK F. HILTZ
CARROLL T. PARDOE
BY
ATTORNEY

INVENTORS
FREDERICK F. HILTZ
CARROLL T. PARDOE

ATTORNEY

United States Patent Office 3,495,077
Patented Feb. 10, 1970

3,495,077
APPARATUS FOR DETERMINING THE TIME INTERVAL CORRELATION OF THE OCCURRENCE OF PULSES
Frederick F. Hiltz, Kensington, and Carroll T. Pardoe, Ellicott City, Md., assignors to the United States of America as represented by the Secretary of the Navy
Filed Apr. 4, 1966, Ser. No. 540,094
Int. Cl. G06g 7/19, 7/00; G06f 15/34
U.S. Cl. 235—181
10 Claims

ABSTRACT OF THE DISCLOSURE

A time interval correlator for extracting time interval information from a pulse type input signal wherein the pulse itself may be of extremely short duration but the time interval between signal pulses may be relatively long and variable over wide limits. The input signal pulses are applied to standardizer circuitry which converts each input pulse of interest into a pulse of standardized pulse width and amplitude. The standardized pulse signal is then applied to a plurality of binary digital delay networks which impart different amounts of time delay to the pulse signal. A plurality of AND gates then check for time coincidence between the delayed pulses from each of the delay networks and undelayed pulses emanating from either the same input pulse signal as the delayed pulses or from a different pulse signal, as selected by a switch. Pulse counters are connected to the AND gates to register a digital count of the number of times coincidence occurs between the delayed and undelayed pulses and this count is converted to a proportionate analog signal indicating the desired time interval correlation function. Logic circuitry, also responsive to the registered count, causes the output analog of the digital to analog circuitry to be selected in accordance with the most significant bits of the registered count.

---

This invention relates generally to computers and more particularly to an improved electronic correlator.

In the field of neuro-physiology, analysis of the majority of neuronal data has been a tiresome task. Many questions and hypotheses posed by investigators in the field have remained unanswered and/or unverified because of inadequate analytical tools. Frequently, in investigations of neuronal behavior, it would be advantageous to know various time relationships between spike discharges in one or more neuronal elements. Of particular advantage would be an indication of these relationships, and their relevance to experimental parameters, as the parameters are being changed.

One measure of the time relationship among spike discharges from a neutron is the instantaneous frequency or its inverse, the time interval between consecutive pulses. The time-interval histogram is a plot of the number of times each particular time interval occurred vs. the time interval. A second relationship is the time-interval between pulses, independent of whether the two pulses being observed are contiguous. When the observed pulses originate from the same source, this second relationship may be thought of as a time-interval auto-correlation of pulses. For pulses emanating from separate sources, this second measure may be thought of as a time-interval cross-correlation of pulses.

Generally, measurements of time relationships between pulses fall into two categories, i.e., on-line or off-line. On-line measurements are those made concurrently with the taking of data. Off-line measurements encompass those made from pre-recorded data.

Off-line measurements of the time relationships between pulses range from the use of manual techniques to the employment of a digital computer. The former is a tedious process and, as a consequence, it is very limited in its application. The latter generally requires a priori knowledge of the areas of profitable measurement. Specially built commercial devices are available which will produce time-interval histograms. Some will also produce auto-correlation and cross-correlation functions. However, the latter are generally constructed to work on continuous waveforms to produce correlations of values rather than correlations of the times of occurrence of discrete pulses, such as neuronal spikes. Furthermore, the band-pass and frequency limits of these devices are small compared to the pulse rates which may be encountered with neuronal discharges.

Obtaining the above-described functions on-line is even more restricting. One very coarse method of measuring the instantaneous time-intervals between consecutive pulses is for the investigator to monitor a display of the neuronal waveforms. This method is entirely unsatisfactory if measures of the time-intervals between non-consecutive pulses are desired, or if the instantaneous frequency is not stationary. Employment of small general purpose laboratory computers requires a large amount of storage capability in order to avoid too narrow a range of measurements. Very few of these small computers have sufficient storage to cover more than a few time class intervals for on-line operation. Additionally, such small computers are generally inadequate for the same reasons mentioned hereinabove in connection with off-line data reduction.

In recognition of these conditions, the subject invention has been designed and constructed to produce, in graphic form, the time interval correlation (either auto-correlation or cross-correlation functions) of the occurrence of pulses. The subject invention may be employed either on-line or off-line. When used with standard oscilloscopes or oscillographs, it can provide the investigator with immediate knowledge of an extensive range of time relationships between pulses in the process he is observing. In this manner, the invention may assist him in directing the course of the experiment. It may also be used as a guide for more detailed off-line analyses. The number of particular time-intervals simultaneously monitored for correlations may be varied by the user.

While designed primarily for employment with neuronal discharges, the subject invention may be used with other waveforms where the interest lies in the time-intervals between discrete epochs, be they consecutive or non-consecutive.

In accordance with the above it is a general object of this invention to provide a device for determining time relationships between discrete pulses.

Another object of the present invention is to provide a device for determining time relationships between discrete pulses emanating from a single source.

Still another object of the instant invention is to provide a device for determining time relationships between discrete pulses emanating from different sources.

It is a further object of this invention to provide a device for performing either auto-correlation or cross-correlation of time-intervals between discrete pulses in either an on-line or an off-line mode.

A still further object of the subject invention is to provide a simple and inexpensive time-interval correlator of discrete pulses having inherent capability of performing expectation density functions and producing time-interval histogram function.

Yet another object of this invention is to provide a device for automatically determining time relationships between discrete epochs associated with a waveform.

The attendant advantages of this invention will be better appreciated and said invention will become clearly understood by reference to the following detailed description when considered in conjunction with the accompanying drawings illustrating one embodiment of the instant invention, wherein:

FIG. 7 is a block diagram of the binary digital-to-analog counter network of FIG. 2 in somewhat greater detail than shown in FIG. 6.

One statistical average which is often of interest is the auto-correlation function. In general, this can be defined as the average number of times two discrete pulses in the same pulse train are separated by a given time delay. Another statistical average is the cross-correlation function, which can be defined as the average number of times two discrete pulses in different pulse trains are separated by a given time delay.

Figure 1:
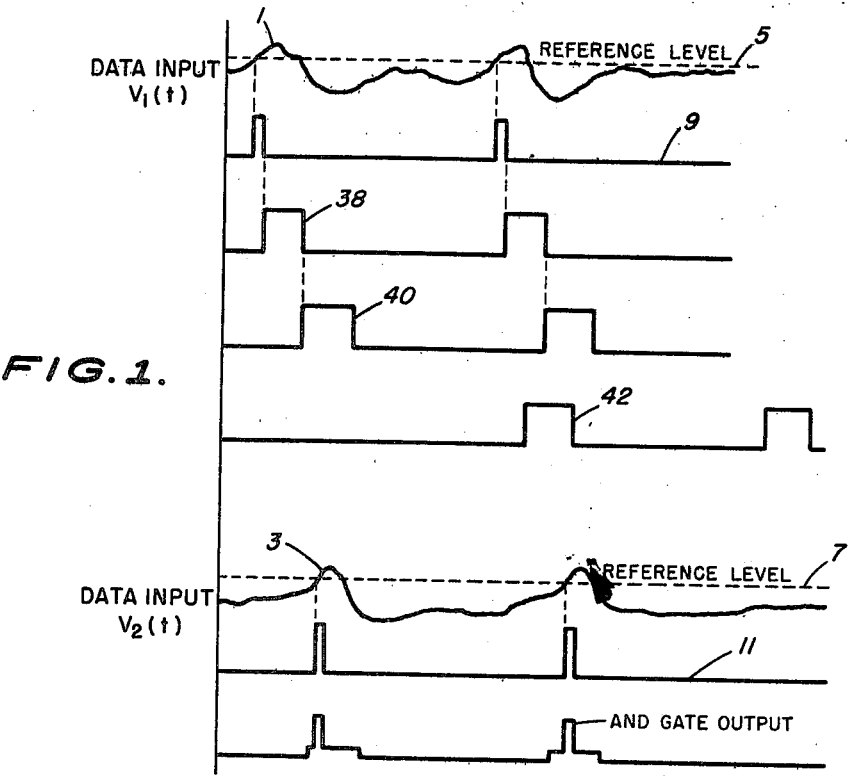
FIG. 1 is a graphical representation of a plurality of signals existing at various points in the instant invention when operating in a correlation mode.

Referring to the drawings in more detail and more particularly to FIG. 1, the waveforms $V_1(t)$ and $V_2(t)$, associated with two distinct processes, are shown at 1 and 3, respectively. Now, let the interest lie in the time relationships associated with the signals 1 and 3 exceeding given reference levels 5 and 7, respectively, and each possessing a positive slope at the time of crossing the reference level. Denote the $k$th time when the signal 1 crosses the reference level 5 with a positive slope by $t_k$. Similarly, denote $t_j$ as the $j$th time when the signal 2 exceeds the reference level 7 with a positive slope. If impulses are generated corresponding to the reference level (or zero) crossings of the waveforms $V_1(t)$ and $V_2(t)$, two impulse trains $X(t_k)$ and $Y(t_j)$, respectively, will be generated. The impulse trains $X(t_k)$ and $Y(t_j)$ are shown at 9 and 11, respectively. Next, observe these two pulse trains from $-T$ to $T$ seconds and define them to be zero everywhere outside of the interval $-T$ to $T$ seconds. Denote the number of impulses associated with the function $V_1(t)$ during the above defined interval as K, the let J denote the number of impulses associated with the function $V_2(t)$ during the same period. Now, subject every impulse in the train of impulses $Y(t_j)$ to a delay of $\tau$ seconds. Next, multiply the function $X(t_k)$ by the function $Y(t_j+\tau)$. Since both of these functions are impulse trains which are zero everywhere except at the impulse, where they are unity, the product of these two functions will be zero everywhere except where there is coincidence in time between the function $X(t_k)$ and $Y(t_j+\tau)$. The product at coincidence will in itself be an impulse. Summing the number of impulses indicating coincidence between the two impulse trains, and dividing by 2T produces the expression $$\psi_{xy}(\tau) = \frac{1}{2T} \sum_{k=1}^{K} \sum_{j=1}^{J} X(t_k) Y(t_j+\tau)$$

which by definition is the cross-correlation function for the two functions $X(t_k)$ and $Y(t_j+\tau)$.

In practice, it is rather difficult and meaningless to operate with a particular value of $\tau$. Therefore, instead of a particular value of delay, a delay class interval of width $\Delta\tau$ is employed. The class interval ranges in delay time from $(n-1)\Delta\tau$ seconds to $n\Delta\tau$ seconds where $n=1, 2, 3 \ldots$. For convenience, class intervals will be designated hereinafter by their upper bound, $n\Delta\tau$.

Proceeding further with the development of the theoretical considerations supporting the instant invention, let each impulse associated with the function $Y(t_j)$ in turn generate a rectangular pulse of unit amplitude, beginning at a time $[t_j+(n-1)\Delta\tau]$ and ending at a time $[t_j+n\Delta\tau]$. The previous expression for the time-interval cross-correlation $\psi_{xy}(\tau)$ may now be written in terms of discrete time delay class intervals as $$\psi_{xy}(n\Delta\tau) = \frac{1}{2T} \sum_{k=1}^{K} \sum_{j=1}^{J} X(t_k) Y(t_j+n\Delta\tau)$$

where $n\Delta\tau$ is the designated class interval of delay as defined supra. Forming the product $X(t_k)$ and $Y(t_j+n\Delta\tau)$ produces an impulse whenever the $t_k$th impulse occurs within the time ranging from $[t_j+(n-1)\Delta\tau]$ to $[t_j+n\Delta\tau]$. Impulses $t_k$, which occur outside of this range will produce a product equal to zero. Similarly, if $Y(t_j)$ is used as the reference impulse train $$\psi_{yx}(n\Delta\tau) = \frac{1}{2T} \sum_{j=1}^{J} \sum_{k=1}^{K} X(t_k+n\Delta\tau) Y(t_j)$$

A special case of the time-interval cross-correlation is the time-interval auto-correlation. Instead of two processes $V_1(t)$ and $V_2(t)$ from which $X(t_k)$ and $Y(t_j)$ were derived, there is only one process $V_1(t)$. The function $Y(t_j)$ is replaced by $X(t_k)$. The time-interval auto-correlation for the impulse train $X(t_k)$ is then seen to be $$\psi_{xx}(n\Delta\tau) = \frac{1}{2T} \sum_{k=1}^{K} X(t_k) X(t_k+n\Delta\tau)$$

In accordance with the above teachings, the product $X(t_k)X(t_k+n\Delta\tau)$ is an impulse when $t_k$ occurs within the time interval denoted by $t_k+n\Delta\tau$, and equals zero when $t_k$ occurs outside of that interval.

The general sequence of events performed by the subject invention with respect to the previous equations is as follows:

(1) operates upon $V_1(t)$ and $V_2(t)$ to generate $X(t_k)$ and $Y(t_j)$, respectively
(2) shifts either $X(t_k)$ or $Y(t_j)$ by an amount $n\Delta\tau$ (assume the former for the purposes of the discussion to follow)
(3) develops the product $X(t_k+n\Delta\tau)Y(t_j)$
(4) performs the summation of the products obtained in (3) above.

The value of T may be obtained in a well-known manner as by a running time meter indicating the total time-interval over which the correlation was being performed.

Another statistical function which may be obtained from the instant invention is an estimate of the expectation density. The expectation density can be defined as the expected number of occurrences of an event following another event within a time-interval $(t, t+\Delta t)$. The estimate is given in the form $$\mu_k = \eta_k / N\Delta t$$

where $\eta_k$ is the observed number of occurrences in N trials at the time segment $j$, the width of which is equal to $\Delta t$. In the preceding expressions concerning correlation, $\Delta t$ is denoted by $\Delta\tau$ and $\eta_k$ by the summation of the products of the impulse train and the delayed impulse train. Thus the expectation density function may take the form $$E = \frac{1}{N\Delta t} \sum_{k=1}^{N} X(t_k) X(t_k+n\Delta t)$$

The value of N may be obtained from a counter which indicates the number of trials used.

In accordance with the teachings of V. J. Caggiano, Pulse Analysis by Histograms, Instruments and Control Systems, vol. 34, March 1961, pp. 498–499, the instant invention is adaptable for providing still another statistical function, a time-interval histogram for the time-intervals between adjacent pulses. Determination of the particular class interval assignment M is $$M = t_k - t_{k-1}/\Delta\tau'$$

where the term $\Delta\tau'$ is the width of the class interval in seconds.

The subject invention operates upon a train of impulses to produce time-interval correlations, expectation density estimates, and/or time-interval histograms of the impulse train. However, it will be recalled that the impulse train was generated from a continuous waveform every time the continuous waveform exceeded a predetermined threshold, and with a positive slope at the time of crossing. Therefore, the functions produced by the instant invention may be applied to the original waveform. For example, the time-interval auto-correlation of the positive slope zero crossing of $V_1(t)$ would be the time-interval auto-correlation of spike occurrences, if $V_1(t)$ represented a train of neuronal discharges and the detection threshold for generation of $X(t_k)$ lay above the threshold level of $V_1(t)$.

Referring again to FIG. 2, the invention is seen to include first and second standardizers 13 and 15, respectively. Each of said standardizers 13 and 15 is of identical construction and essentially comprises a well-known Schmitt trigger circuit. An input signal 1 (FIG. 1) representing the function $V_1(t)$ is applied to the input of the standardizer 13 and an input signal 3 (FIG. 1) representing the function $V_2(t)$ is applied to the input of the standardizer 15. The standardizers 13 and 15 function to produce output pulses 9 and 11 (FIG. 1) respectively (of fixed amplitude and width), each time their respective applied input signals 1 and 3 exceed a predetermined threshold, and with an appropriate slope at the instant of crossing. The signals 9 and 11 represent the functions $X(t_k)$ and $Y(t_j)$, respectively, as mentioned hereinabove.

The output signal from the standardizer 13 is fed to a terminal 17 and to a cascaded string of delay networks 19, 20 and 21. It is to be emphasized that any desired number of delay networks can be serially connected, however, only three such networks are illustrated for purposes of clarity. The delay networks such as 20 and 21 are identical but differ from the delay network 19.

Figure 4:
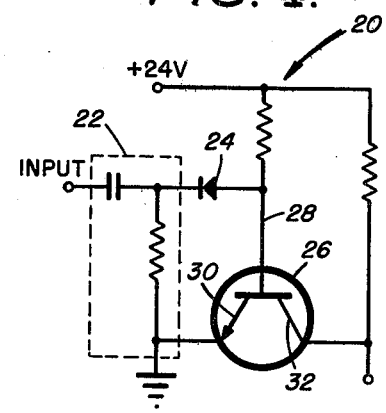
FIG. 4 is a schematic of one of the delays $\Delta\tau$ of FIG. 2.

As best seen in FIG. 4, the delay network 20 is shown in schematic and comprises a differentiating network 22, a diode 24, and a transistor 26 having a base 28, a grounded emitter 30, and a collector 32. One side of the output of the differentiating network 22 is connected to the base 28 through the diode 24, the forward direction of said diode 24 being from the base 28 to said differentiating network 22. The other side of the output of said differentiating network 22 is grounded. The delay network 20 operates on the principle of differentiating the applied input pulse through an RC network (the differentiating network 22), and then applying the differentiated signal to the base 28 of the normally saturated transistor 26. Since the transistor 26 is already saturated, the initial positive portion of the differentiated signal is ineffective. However, the negative portion commencing with the fall of the input pulse turns off the transistor. When the transistor is turned off, the collector 32 voltage changes rapidly, rising to approximately the positive supply voltage used for the transistor 26. This collector voltage level is maintained for a length of time determined by the time constant of the RC differentiating circuit 22.

If a pulse is applied to the delay network 20 which is much more narrow than the desired output pulse width, a problem arises. To illustrate, assume that the input pulse to the differentiating network 22 is derived directly from the standardizer 13. The durationg of this pulse is much less than the differentiating time constant. The result is that the differentiated signal will not have returned to zero prior to the falling phase of the input signal. As a consequence, the negative amplitude of the signal at the transistor base 28 will be less than desired, and the transistor will no longer be cut off. This will produce an output pulse which is much narrower than desired. It is to circumvent this problem that the delay circuit 19, which is directly connected to the standardizer 13, is constructed in a slightly different manner from the other delay networks such as 20 and 21.

Referring again to FIG. 3, the delay network 19 is shown in schematic, and is seen to be nearly identical to the delay network 20 (FIG. 4) with the addition of an impedance matching network 34 and a diode 36. The delay network 19 includes a differentiating network 22a, a diode 24a, and a transistor 26a having a base 28a, a grounded emitter 30a and a collector 32a.

One side of the output of the differentiating network 22a is connected to the base 28a through the diode 24a, the forward direction of said diode 24a being from the base 28a to said differentiating network 22a. The other side of the output of said differentiating network 22a is grounded. The delay network 19 operates on the principle of differentiating the applied input pulse through an RC network (the differentiating network 22a), and then applying the differentiated signal to the base 28a of the normally saturated transistor 26a in the same manner as the delay network 20. To circumvent the above-mentioned problem involving very narrow input pulses the charging time constant is made small by using the diode 36 in series with the output of the differentiating network 22a and forward conducting toward the emitter 30a of the transistor 26a. The signal may then return to approximately zero volts before the input pulse terminates. The discharge path is through the reverse biased diodes 36, producing a discharge time constant which is much larger than the charging time constant. This results in the desired output pulse duration, although the input pulse is rather narrow.

Figure 3:
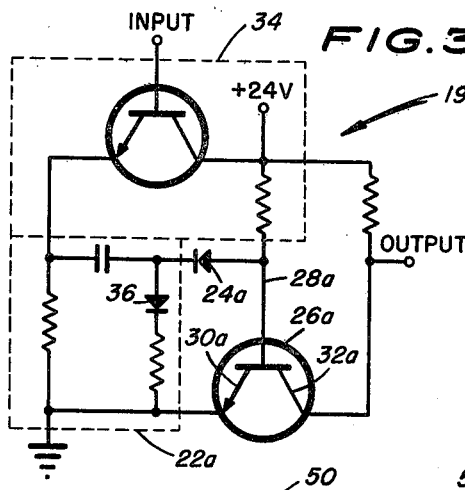
FIG. 3 is a schematic of the delay network $\Delta\tau_0$ of FIG. 2.

Any desired total delay of the signal $9(X(t_k))$ may be achieved by connecting in series the delay network of FIG. 3 and an appropriate number of circuits of the type shown in FIG. 4. The output pulse from the $n$th delay circuit is $X(t_k+n\Delta\tau)$, where $n$ may equal any integer. The individual delay period per stage may be changed by altering the individual RC time constants thereof. Typical wave shapes for the output signals from the delay networks 19, 20 and 21 are shown at 38, 40 and 42, respectively (FIG. 1).

Referring again to FIG. 2, a switch is shown at 44 capable of contacting either the output terminal of the standardizer 15 or the output terminal 17. As shown in the figure, the switch 44 is connected to the output of the standardizer 15 and is in the position for cross-correlation. When the switch 44 is connected to the terminal 17 both input signals will be derived from the same standardizer (the standardizer 13) and hence the unit will provide an auto-correlation of the output of the standardizer 13.

Having now generated a reference pulse train $Y(t_j)$ and a delayed pulse train $X(t_k+n\Delta\tau)$, it is necessary to form the product of these two signals. Since the signals are both either zero or positive at any instant of time, this product may be formed by a coincidence or "and" gate. Thus, the output signal from the delay network 20 is fed to an "and" gate 46, and that of the delay network 21 is fed to an "and" gate 48. In a like manner the output of all the additional delay networks which may be employed are each sent to a separate "and" gate with the exception of the output from the delay network 19. Each of the "and" gates such as 46 and 48 additionally receive an input signal from either the standardizer 13 or 15, through the switch 44, depending on whether the switch 44 is in position for auto or cross-correlation. Component tolerance in the delay circuits may cause a variation in the pulse widths from the delay circuits which is not acceptable to the user. In that event, instead of employing simple diode "and" gates, the following circuitry may be employed to insure correct time position and duration of the delay pulse.

Figure 2:
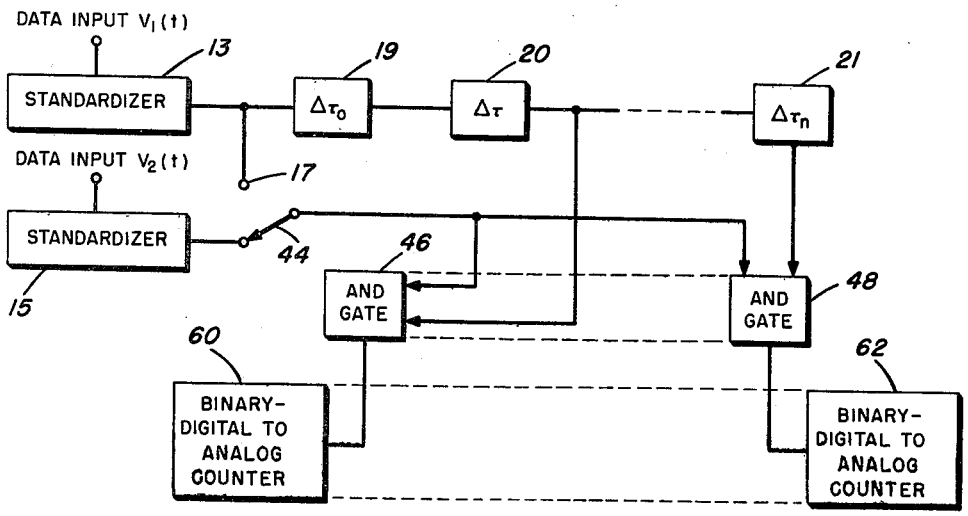
FIG. 2 is a simplified block diagram of the instant invention.
Figure 5:
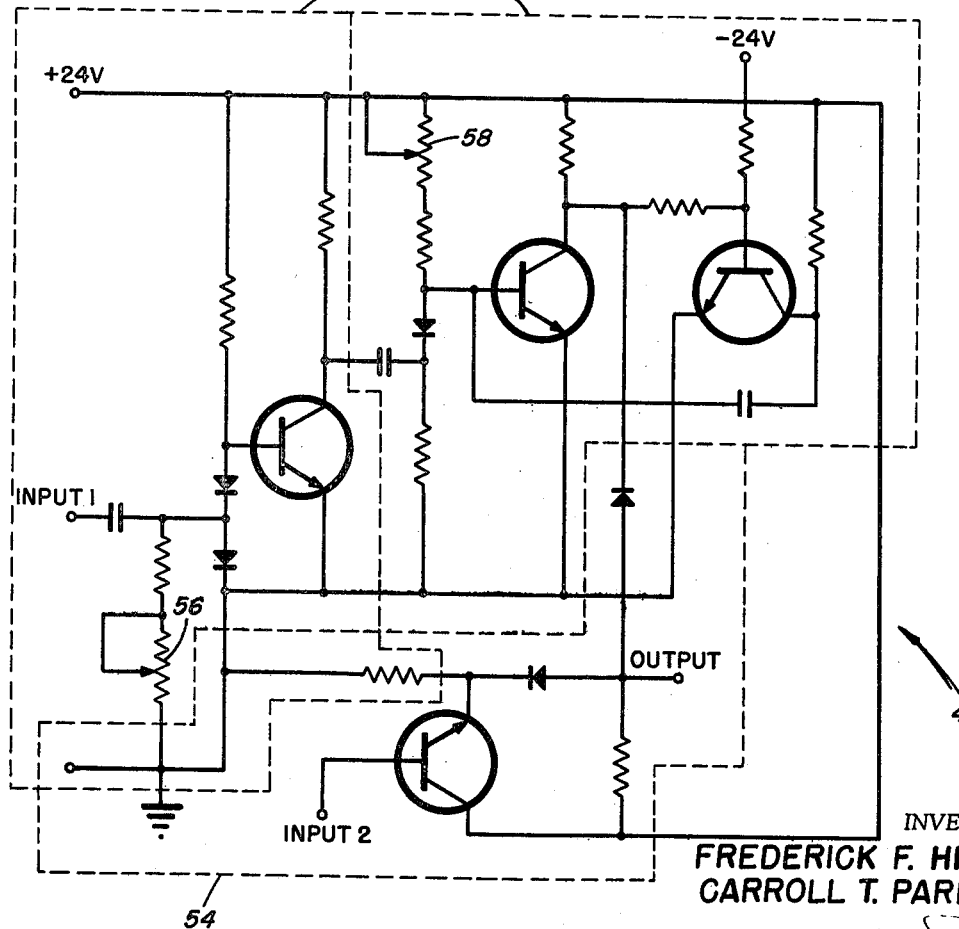
FIG. 5 is a schematic of one of the "and" gates of FIG. 2.

Referring again to FIG. 5, a typical controllable "and" gate such as the "and" gate 48 is shown in schematic. The gate 48 is seen to include three distinct portions, a pulse stretching network 50, a monostable multivibrator 52, and a standard "and" gate 54. The input signal representing $X(t_k+n\Delta\tau)$ to the controllable "and" gate 48 is applied to the pulse stretching portion 50. The network 50 is essentially the same as the network 19 (FIG. 3) except that the R in the RC time constant is a potentiometer 56 rather than a fixed resistor. The pulse output from the network 50 is thereby of controllable duration. The output from the network 50 is in turn fed as a trigger pulse to the monostable multivibrator network 52 which produces a pulse initiated by the trailing edge of its input. Therefore, the initiation time of the pulse output from the monostable multvibrator network 52 is controllable. The width of the output pulse from the multivibrator network 52 is also controllable by a potentiometer 58, producing a pulse which is controllable in position and duration. For accurate values of $n\Delta\tau$, it is the output pulse from the monostable multivibrator portion 52 which is actually used as the delay pulse input to the "and" gate portion 54. There is an output pulse from an "and" gate, such as the "and" gate 48, only when there is coincidence between the signals $Y(t_j)$ and $X(t_k+n\Delta\tau)$ entering the "and" gate. Hence, the output of the "and" gate 48 is the product $Y(t_j)X(t_k+n\Delta\tau)$ when connected as shown in FIG. 2. Each of the "and" gates such as the "and" gates 46 and 48 are identical and each will form a product output for a discrete delay period utilized.

After obtaining the product of the signals $X(t_k+n\Delta\tau)$ and $Y(t_j)$, the next operation is the summation of the pulses representing coincidence of the two signals. This may be accomplished in a well-known manner as by the use of standard integrate and hold circuits. However, a more satisfactory method of accomplishing the desired summation resides in obtaining the necessary summation with a specially designed binary digital-to-analog counter. As best seen in FIG. 2, the pulses from each of the "and" gates such as 46 and 48 are fed to distinct binary digital to analog counters such as 60 and 62, respectively.

If desired, the train of pulses from an "and" gate would be applied to a series of connected string of bistable multivibrators, or a binary counter. The binary count would then be transformed to an analog voltage with a gated summing digital-to-analog converter. However, the count capability desired is a minimum of 2048 for each counter ($2^{11}$), and a conventional digital-to-analog converter which could handle an eleven-bit input (the twelfth bit can be a light) would result in an impractical range of current summing resistors, high cost, and poor accuracy in the small count range. The range of current summing resistors could be reduced by dropping the five least significant bits prior to the digital-to-analog conversion, however, this would eliminate any count indication below thirty two counts. To circumvent these difficulties and retain a low cost per digital-to-analog conversion, the binary digital-to-analog counter such as 60 or 62 was developed and will be described in detail hereinafter.

Referring again to FIG. 6, a typical binary digital-to-analog counter of FIG. 2 is shown generally at 60 and includes a cascaded string of twelve bistable multivibrators, or flip flops. Each of the flip flops has two outputs, $F_j$ and $\overline{F}_j$, where $j$ is an integer corresponding to the number of the particular flip flop of interest in the cascaded chain. The manner of connection of the flip flops is such that the output signal from an "and" gate (such as the "and" gate 46) serves as the input signal to the first flip flop and the $F_j$ output of each of the first eleven flip flops serves as the input signal to the next succeeding flip flop in the chain. The $\overline{F}_j$ output signals from each of the first eleven flip flops are fed to the logic circuitry 64 (to be described in more detail hereinafter) and, additionally, the $\overline{F}_j$ output signals of the sixth, seventh, eighth, ninth, tenth, eleventh and twelfth flip flops are fed to lights 66, 68, 70, 72, 74, 76 and 78, respectively. The $F_j$ output signals from the seventh, eighth, ninth, tenth and eleventh flip flops are additionally sent to the logic circuitry 64.

Figure 6:
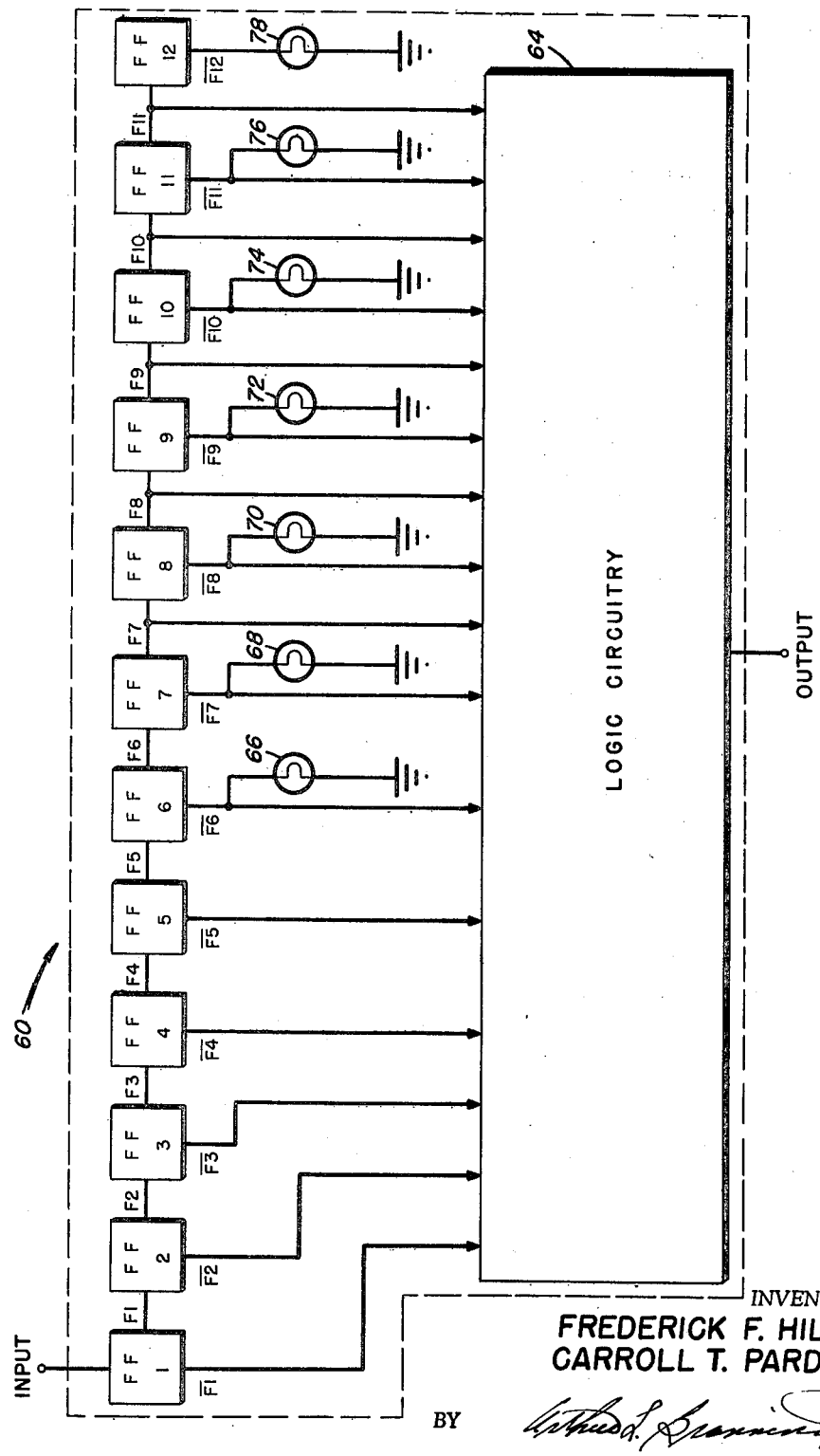
FIG. 6 is a simplified block diagram of the binary digital-to-analog counter of FIG. 2.
Figure 2:
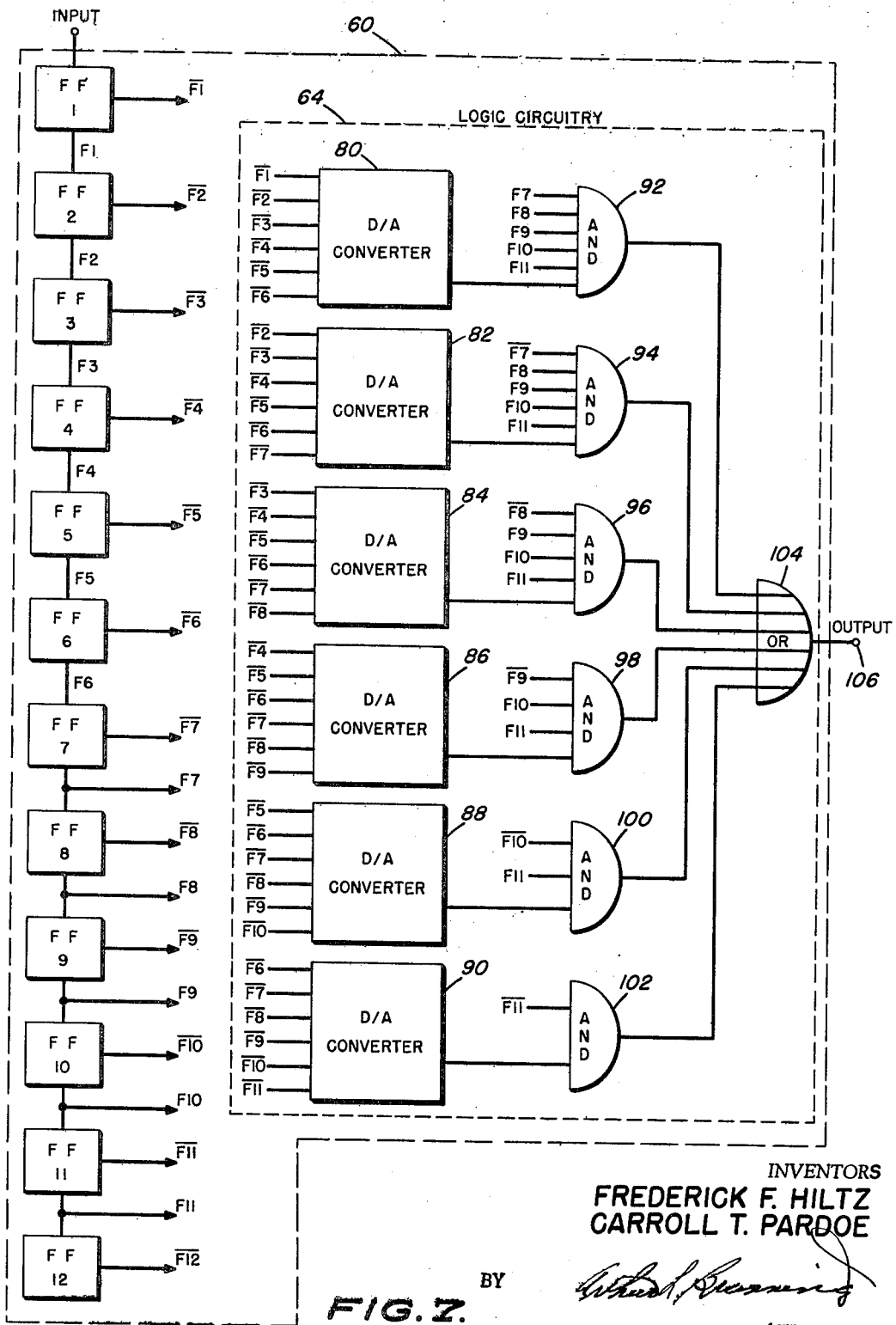

Referring now to FIG. 7, the counter 60 and its associated logic circuitry 64 are shown in somewhat greater detail than in FIG. 6. It can readily be seen that the $\overline{F}_j$ outputs of each of the first six flip flops are connected to the input of a conventional digital-to-analog converter 80, the $\overline{F}_j$ outputs of the second through seventh flip flop are connected to a conventional digital-to-analog converter 82, the $\overline{F}_j$ outputs of the third through eighth flip flops are connected to a conventional digital-to-analog converter 84, the $\overline{F}_j$ outputs of the fourth through ninth flip flops are connected to a conventional digital-to-analog converter 86, the $\overline{F}_j$ outputs of the fifth through tenth flip flops are connected to the input of a conventional digital-to-analog converter 88, and the $\overline{F}_j$ outputs of the sixth through eleventh flip flops are connected to the input of a conventional digital-to-analog converter 90. The output of the digital-to-analog converter 80 is connected to the input of a conventional "and" gate 92 along with the $F_j$ outputs of the seventh through eleventh flip flops. The outputs from the digital-to-analog converter 82 is connected to the input of a conventional "and" gate 94, as are the $\overline{F}_j$ output of the seventh flip flop and the $F_j$ outputs of the eighth through eleventh flip flops. The outputs from the digital-to-analog converter 84 is connected to the input of a conventional "and" gate 96 together with the $\overline{F}_j$ output of the ninth flip flop and the $F_j$ outputs of the ninth through eleventh flip flops. The outputs from the digital-to-analog converter 86 is connected to the input of a conventional "and" gate 98 together with from the tenth and eleventh flip flop. The output from the digital-to-analog converter 88 is connected to the input of a conventional "and" gate 100 together with the $\overline{F}_j$ output from the tenth flip flop and the $F_j$ output from the eleventh flip flop. In a like manner, the output from the digital-to-analog converter 90 is connected to the input of a conventional "and" gate 102 together with $\overline{F}_j$ output of the eleventh flip flop. The outputs of each of the "and" gates 92, 94, 96, 98, 100 and 102 are connected to the input of a conventional "or" gate 104, the output 106 of which provides the desired summation in analog signal form.

Considering the operation of the digital-to-analog converter counter 60 in more detail, let each of the twelve flip flops be initially in the $F_j$ state. The first input pulse from the "and" gate 60 will cause the first flip flop to change to the $\overline{F}_j$ state. The second input pulse will switch the first flip flop to the $F_j$ state and switch the second flip flop to the $\overline{F}_j$ state. Successive input pulses will change the state of the serially connected flip flops until sixty-three pulses have occurred. At this time the first six flip flops will all be in the $\overline{F}_j$ state. It should be noted at this point that with the occurence of the thirty second input pulse the sixth flip flop was switched to the $\overline{F}_j$ state causing the light 66 (FIG. 6) to turn on. This light provides an indication that the cumulative count is between 32 and 63.

Prior to the occurrence of the sixty-fourth input pulse the seventh through eleventh flip flop will remain in the $F_j$ state. Therefore, prior to the occurrence of the sixty-fourth input pulse there will always be an "and" condition at the "and" gate 92 whenever there is an output signal from the digital-to-analog converter 80. This "and" condition will allow passage of the output signal from the digital-to-analog converter 80 through the "and" gate 92 and subsequently through the "or" gate 104 to the output terminal 106.

With the occurrence of the sixty-fourth input pulse the seventh flip flop will be switched to the $F_j$ state and there will no longer be an "and" condition at the "and" gate 92. Therefore, control of the summing operation will now be transferred from the digital-to-analog converter 80 to the digital-to-analog converter 82. Additionally, the light 68 (FIG. 6) will be turned on providing an indication that the sum is between sixty-four and one hundred and twenty-seven. With the occurrence of the one hundred and twenty-eighth input pulse there will no longer be an "and" condition at the "and" gates 92 or 94, and control of the summing operation will now be transferred to the digital-to-analog converter 84. The light 70 (FIG. 6) will now be on indicating the cumulative count is between one hundred and twenty-eight and two hundred and fifty-five. In a like manner, control of the summing operation will be successively shifted to the digital-to-analog converters 86, 88 and 90 with the occurrence of the two hundred and fifty-sixth, five hundred and twelfth and one thousand and twenty-fourth input pulses, respectively. Additionally, the lights 72, 74 and 76 (FIG. 6) will be successively turned on to provide a coarse indication of the cumulative sum. The digital-to-analog converter 90 will have control of the summing operation through the two thousand and forty-seventh input pulse. The next input pulse will cause the twelfth flip flop to switch to the $F_j$ state and turn on the light 78. At this point the first eleven flip flop will be in the $F_j$ state and the counter will have completed one cycle and have effectively cleared itself.

Thus, with the above-mentioned scheme, the digital-to-analog counter 60 will automatically change its scale factor by always converting the six most significant non-zero bits to a corresponding analog voltage. With this method, the maximum error is three percent and occurs in the range of one thousand and twenty-four to two thousand and forty-eight counts. The potential output from the above-described digital-to-analog counter is available as a meter indication, or it may be displayed on an oscilloscope, or as an oscillographic recording.

An advantageous feature of the instant invention is that more than one value of $n\Delta\tau$ may be employed during an operation. For any given number of delay circuits it is conceivable to simultaneously obtain that number of correlations or expectation density estimates by incorporating an equal number of "and" gates (such as "and" gates 46 and 48) and digital-to-analog counters 60, the number employed being dictated by size and cost and the parameters of the particular experiment under consideration.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims the instant invention may be practised in a manner otherwise than is specifically described herein.

What is claimed is:

1. Apparatus for determining the time interval correlation of the occurrence of pulses comprising,
   standardizer means connected to receive input signal pulses for generating an output pulse of standardized pulse width and pulse amplitude demarcating the occurrence of each input signal pulse of interest,
   a plurality of binary delay networks serially connected to said standardizer means for generating output pulses delayed by predetermined amounts of time from said standardized pulse output,
   a plurality of coincidence means each connected to said standardizer means and one of which is connected to each of said plurality of binary delay networks for producing an output pulse denoting time coincidence between said standardizer pulse output and each of said delayed output pulses, and
   counter means operably connected to each of said coincidence means for registering a count of the number of output pulses produced by each of said coincidence means for each of said predetermined amounts of time delay.

2. The apparatus specified in claim 1 wherein said coincidence means comprises a plurality of AND gates each connected to receive the pulse output from said standardizer means and the delayed pulse output from one of said plurality of binary delay networks and capable of producing an output signal indicative of time coincidence between said standardizer pulse output and said delayed pulse output.

3. The apparatus specified in claim 1 wherein said plurality of binary delay networks are connected in series with one another and each comprises,
   a differentiating circuit for differentiating an input pulse to produce a pair of time spaced output pulses of opposite polarity,
   a normally saturated single stage transistor amplifier having a base, an emitter and a collector,
   the second pulse of said pair of time spaced pulses produced by said differentiating circuit being of a polarity to momentarily cut off said transistor amplifier, and
   a diode connected between said differentiating circuit and the base of said transistor amplifier for coupling only the second pulse output of said differentiating circuit to said transistor amplifier to momentarily cut off said transistor amplifier and thereby produce an output pulse signal from said transistor amplifier which is delayed in time from said input pulse applied to said differentiating circuit.

4. The apparatus specified in claim 2 wherein each of said AND gates comprises,
   a pulse stretching circuit means connected to the delayed pulse output of one of said binary delay networks for converting said delayed pulse output into an output pulse having an increased pulse width,
   a monostable multivibrator circuit connected to be triggered by the trailing edge portion of the output pulse from said pulse stretching means to produce an output pulse, and
   coincidence circuit means connected to receive the output pulse from said monostable multivibrator circuit and the standardized pulse output from said standardizer means for producing a coincidence pulse output only when there is time coincidence between said standardized pulse output and the output pulse from said monostable multivibrator circuit.

5. The apparatus specified in claim 4 wherein, said pulse stretcher circuit means is adjustable for varying the pulse width of the output pulse from said pulse stretcher circuit and therefore the point in time at which said monostable multivibrator circuit is triggered, and
   said monostable multivibrator circuit is adjustable for varying the width of the output pulse from said monostable multivibrator circuit,
   whereby both the time positioning and pulse width of said monostable multivibrator output pulse is variable.

6. The apparatus specified in claim 2 wherein said counter means comprises a separate pulse counter means connected to the output of each of said AND gates.

7. The apparatus specified in claim 6 wherein, each of said pulse counter means comprises a plurality of serially connected flip-flop circuits for registering a binary digital count of the number of coincidence output pulses produced by the connected AND gate, and further including,
   a digital to analog converter means operably connected to said flip-flop circuits for converting said binary digital count into a proportionate analog output signal.

8. The apparatus specified in claim 7 further including means responsive to the count registered by said flip-flop circuits for causing said analog output signal to be proportionate only to a predetermined group of the most significant bits of said binary digital count.

9. The apparatus specified in claim 7 wherein, said digital to analog converter means comprises a plurality of digital to analog converters each connected to a different group of said flip-flop circuits contained in said pulse counter means, and further including, an AND gate means connected to the output of each said digital to analog converters and responsive to the binary digital count registered by said flip-flop circuits for passing only the analog output of that digital to analog converter representing the most significant bits of said registered count.

10. An apparatus for determining the time interval correlation of the occurrence of pulses comprising, a first standardizer circuit connected to receive a first input pulse signal for generating an output pulse of standardized pulse width and pulse amplitude demarcating the occurrence of each input signal pulse of interest in said first input pulse signal, a second standardizer circuit connected to receive a second input pulse signal for generating an output pulse of standardized pulse width and pulse amplitude demarcating the occurrence of each input signal pulse of interest in said second input pulse signal, a plurality of binary delay networks serially connected to said first standardizer circuit for generating output pulses delayed by predetermined amounts of time from the standardized pulse output of said first standardizer circuit, a plurality of coincidence means one of which is connected to each of said plurality of binary delay networks, switch means for selectively connecting the output of either said first or second standardizer circuits to each of said coincidence means to cause said coincidence means to produce an output pulse denoting time coincidence between each of said delayed output pulses and the standardized pulse output of either said first or second standardizer circuits as selected by said switch means, and counter means operably connected to each of said coincidence means for registering a count of the number of output pulses produced by each of said coincidence means for each of said predetermined amounts of time delay.

References Cited

UNITED STATES PATENTS

| | | | |
|---|---|---|---|
| 3,840,308 | 6/1958 | Van Horne | 235—181 |
| 3,023,966 | 3/1962 | Cox et al. | 235—181 |
| 3,038,069 | 6/1962 | Tuller | 235—181 X |
| 3,211,899 | 10/1965 | Shreve | 235—181 |
| 3,217,289 | 11/1965 | Elliott et al. | 235—181 X |
| 3,337,870 | 8/1967 | Allen et al. | 235—181 X |

MALCOLM A. MORRISON, Primary Examiner

F. D. GRUBER, Assistant Examiner

U.S. Cl. X.R.

324—77; 235—92, 150.5; 307—267; 325—325; 340—347